(12) United States Patent
Ferguson et al.

(10) Patent No.: US 7,093,330 B2
(45) Date of Patent: Aug. 22, 2006

(54) SNAP-HOOK TETHER

(76) Inventors: Thomas Burton Ferguson, 1036 Timber Ridge Ct., Kingston Springs, TN (US) 37082; Michael Hanley McDonald, 5340 Indian Valley Rd., Franklin, TN (US) 37064

( * ) Notice: Subject to any disclaimer, the term of this patent is extended or adjusted under 35 U.S.C. 154(b) by 13 days.

(21) Appl. No.: 10/465,136

(22) Filed: Jun. 19, 2003

(65) Prior Publication Data

US 2004/0255437 A1    Dec. 23, 2004

(51) Int. Cl.
*F16B 45/02*    (2006.01)
(52) U.S. Cl. .................................... 24/599.6
(58) Field of Classification Search ............... 24/599.1, 24/599.4–599.9, 600.2; 294/82.19, 82.21
See application file for complete search history.

(56) References Cited

U.S. PATENT DOCUMENTS

| 456,137 | A | * | 7/1891 | Clary | 24/600.2 |
| 499,304 | A | * | 6/1893 | Minshall | 24/599.6 |
| 865,224 | A | * | 9/1907 | Applegate | 24/599.7 |
| 2,116,880 | A | * | 5/1938 | Dee | 294/19.1 |
| 2,246,630 | A | * | 6/1941 | Johnson | 294/19.1 |
| 2,562,401 | A | * | 7/1951 | Wheeler | 24/599.6 |
| 2,608,736 | A | * | 9/1952 | Blazewicz | 24/599.7 |
| 4,621,851 | A | * | 11/1986 | Bailey, Jr. | 294/82.2 |
| 4,679,280 | A | * | 7/1987 | Krahenbuhl | 24/599.6 |

FOREIGN PATENT DOCUMENTS

GB    2106584 A  *  4/1983

* cited by examiner

*Primary Examiner*—James R. Brittain
(74) *Attorney, Agent, or Firm*—Michael Zarrabian, Esq.; Myers Dawes Andras & Sherman, LLP

(57) ABSTRACT

A snap-hook that has a hook, forming a portion of an eye loop, and a lever that is pivotally movable relative to the hook. The lever forms a remaining portion of said eye loop with respect to the hook. A thumb tab is connected to the lever, and is positioned in a slot defined in the hook. The thumb tab is slidable in the slot relative to the hook, forming a release mechanism, such that the sliding movement of the thumb tab in the slot causes the lever to pivot relative to the hook to open said eye loop. The snap-hook has essentially broad, opposing, front and back sides, and relatively narrower edges, such that the back side of the snap-hook can be placed into the palm of a user's hand to hold the snap. The thumb tab is located on the front side of the snap-hook to allow simpler holding of the snap-hook and operation of the release mechanism with one hand while essentially eliminating swiveling of the snap-hook in the hand.

21 Claims, 2 Drawing Sheets

SNAP-HOOK TETHER

FIELD OF THE INVENTION

The present invention related to the field of snap-hooks, and in particular, to the field of snap-hooks for outdoor and equestrian applications.

BACKGROUND OF THE INVENTION

Snap hooks are used for a variety of purposes. Typically a snap-hook includes a hook and a lever that opens/closes the hook. Bolt snap-hooks provide a thumb operated spring-loaded plunger, with an up and down motion. To open the bolt snap-hook, pressure is applied to a thumb tab to push down the plunger. However, it can be difficult to depress/open that snap as the pressure to push the thumb tab down (to open) will cause the snap to swivel in the hand. This is due to the tab's location on the narrow width/edge of the snap. Also, the thumb tab must be depressed to attach the snap to an object.

Bull snap-hooks employ a swivel tab that pulls forward to open the snap-hook. However, this requires the use of two hands; one to hold the snap-hook and another to pull the tab outward. The "two handed" operation presents problems to users such as in the equestrian industry. For example, to attach or disconnect this snap-hook to a horse halter (when the snap-hook is used on a lead rope), the user must first let go of the halter to free both hands (momentarily losing control of the horse) in order to open the snap-hook for either attachment or disconnection of the snap-hook to/from the halter.

Marine snap-hooks incorporate a spring loaded tab, folding inward to open, to hook an object. However, disconnecting/opening this snap-hook from an object with one hand requires great dexterity, and can force the finger(s), used to push/fold back the tab, between the tab and the body of the snap-hook; a potentially hazardous operation. For most users, two hands are required to unhook this snap-hook.

There is, therefore, a need for an improved snap-hook that provides one-hand, easy, operation.

BRIEF SUMMARY OF THE INVENTION

The present invention addresses the above needs. In one embodiment, the present invention provides, a snap-hook that allows "one handed" operation. The snap-hook comprises a hook, forming a portion of an eye loop, and a lever that is movable relative to the hook, the lever forming a remaining portion of said eye loop with respect to the hook. A thumb tab is connected to the lever, and is positioned in a slot defined in the hook, whereby the thumb tab is slidable in the slot relative to the hook, forming a release mechanism, such that the sliding movement of the thumb tab in the slot causes the lever to move relative to the hook to open said eye loop. The snap-hook has essentially broad, opposing, front and back sides, and relatively narrower edges, such that the back side of the snap-hook can be placed into the palm of a user's hand to hold the snap, wherein the thumb tab is located on the front side of the snap-hook to allow simpler holding of the snap-hook and operation of the release mechanism with one hand while essentially eliminating swiveling of the snap-hook in the hand.

In another embodiment of the snap-hook, according to the present invention, the lever is pivotally movable relative to the hook. The thumb tab is connected to the lever, and is positioned in a slot defined in the hook, wherein the thumb tab is slidable in the slot relative to the hook, such that the sliding movement of the thumb tab in the slot causes the lever to pivot relative to the hook to open said eye loop.

Yet in another embodiment, the present invention provides a snap hook comprising a hook section having an open segment, thereby forming a portion of an eye loop, and a lever that is pivotally movable relative to the open segment of the hook section to block and unblock the open segment, the lever forming a remaining portion of said eye loop with respect to the hook section. A biasing means, such as spring, is positioned between the hook and the lever for biasing the lever against pivoting relative to the hook. A tab is connected to the lever, wherein the tab includes an extension disposed in a slot defined in the hook section, such that the tab extension is slidable in the slot relative to the hook section. The tab and the lever form a release mechanism, such that applying force to the tab that overcomes said biasing, effects the tab extension to slide in the slot, thereby causing the lever to pivot relative to the hook section to open said eye loop.

Therefore, an improved snap-hook according to the present invention provides one-hand, easy, operation and flexibility.

BRIEF DESCRIPTION OF THE DRAWINGS

These and other features, aspects and advantages of the present invention will become understood with reference to the following description, appended claims and accompanying figures where:

FIG. 6 shows a side view of the lever of the snap hook of FIG. 1;

FIG. 7 shows a cross-section view of the lever of FIG. 6;

DETAILED DESCRIPTION OF THE INVENTION

Figure 1:
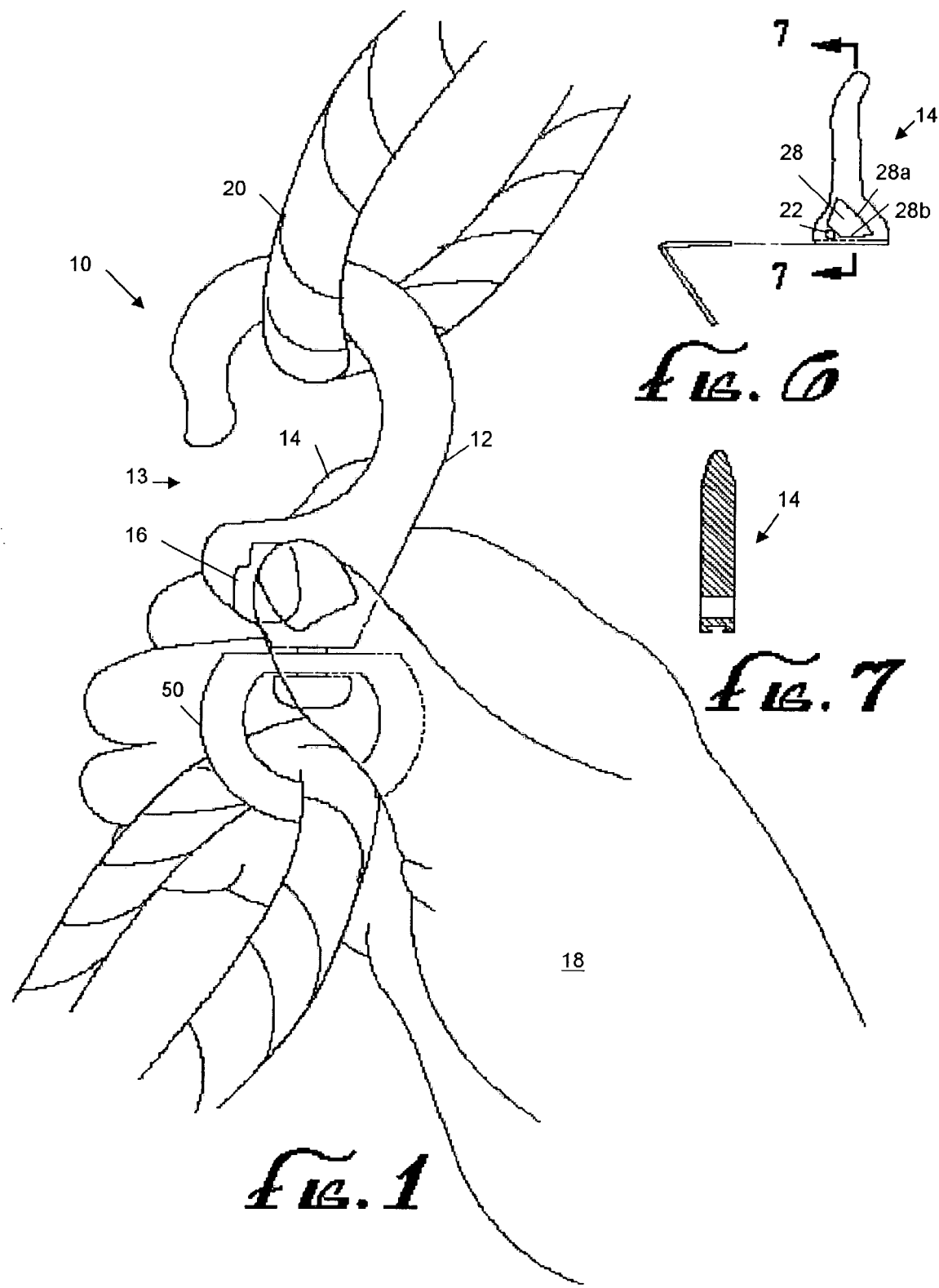
FIG. 1 shows an embodiment of a snap hook according to the present invention as held by a user with the lever in the open position, attached to a rope.

Referring to FIG. 1, in one embodiment, the present invention provides, a snap-hook 10 that allows "one handed" operation. The snap-hook 10 comprises a hook 12 and a lever 14 that opens/closes the hook. The snap-hook 10 combines an "easy on" feature, along with a thumb actuated tab 16 for moving the lever 14. As shown in FIG. 1, the location of the thumb tab 16 is on the side of the snap-hook 10, facing the user as the snap-hook 10 lays flat in the palm of a user's hand 18.

As such, the snap-hook 10 provides quick access to the thumb tab 16, and the location of the thumb tab 16 makes it much easier to depress/push down the tab 16 to move the lever 14. This allows for not only a quick and easy release/opening of the snap-hook 10, but also essentially eliminates any swiveling effect associate with conventional snap hooks. This is because the pressure to depress the thumb tab 16 is evenly distributed against the width of the snap-hook 10 as it is properly supported in the palm of the hand 18, facing the user. Further, the thumb tab 16 does not need to be depressed (e.g., pushed down) to open or attach the snap-hook 10 to an object, such as a rope 20.

Figure 3:
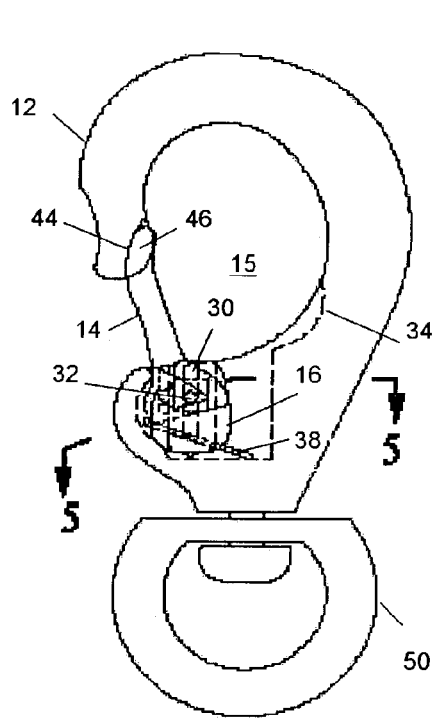
FIG. 3 shows the snap hook of FIG. 1 with the lever in closed position.

As shown by example in FIG. 1, the hook 12 has an aperture 13, and the lever 14 is pivotally attached to the hook 12 for opening and closing the aperture 13. The hook 12 and lever 14 essentially form a loop 15 or an eye loop, as shown in FIG. 3. Now also referring to FIGS. 5 and 6, the lever 14 includes a hole 22 proximate an end thereof, and the hook 12 includes a corresponding hole 24 proximate said aperture 13, wherein the lever 14 is pivotally attached to the hook 12 by passing a pivot pin 26 through said holes 22, 24.

Figure 2:
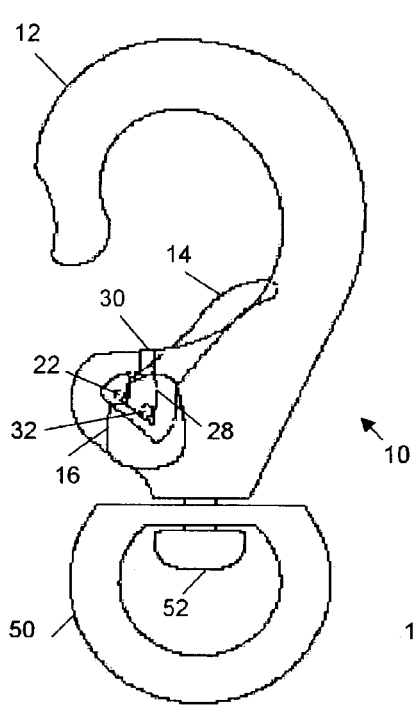
FIG. 2 shows the snap hook of FIG. 1 in more detail with the level moved to the open position by pushing down on a thumb tab.
Figure 4:
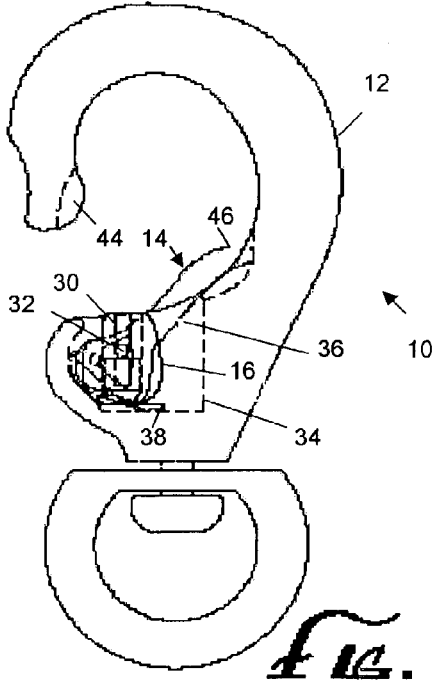
FIG. 4 shows the snap hook of FIG. 3 with the lever moved to the open position by direct pressure on the lever, and without moving the thumb tab.

As shown in FIGS. 2–4 and 6–7, the lever 14 further includes an opening 28 (e.g., triangular) for receiving the thumb tab 16, and the hook 12 further includes a slot 30 that allows a pin 32 the thumb tab 16 to slide up and down the slot 30. Though in the drawings the slot 30 is shown as straight and in the vertical direction, essentially parallel to the lever 14, in other embodiments of the snap-hook 10 the slot 30 can be of different shapes (e.g., curved) and in other directions which allow the thumb tab 16 to slide therein for pivoting the lever 14 to open the eye loop 15 by unblocking the hook aperture 13, as shown in FIGS. 2 and 4.

Figure 5:
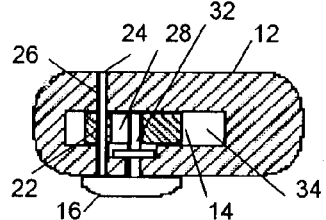
FIG. 5 shows a cross section view of the snap hook of FIG. 1.

Referring to FIGS. 3–5, a lower portion of the hook 12 has an essentially recessed section 34 that allows (accommodates) movement of a portion 36 of the lever 14 into the recessed section 34 as the thumb tab 16 is pulled down along the slot 30. A biasing element such as a spring 38 in the recessed section 34 of the hook 12 presses against the bottom 40 of the lever 14 (FIG. 8) as the lever 14 is pivoted about the pivot pin 26, and a portion of the lever 14 is moved (e.g., lowered) into the recessed section 34 of the hook 12 for hook release as in FIG. 4.

Figure 8:
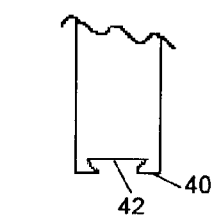
FIG. 8 shows a detailed view of a bottom portion of the lever of FIG. 6.
Figure 9:
FIG. 9 shows a view of the spring mechanism of the snap hook of FIG. 1.

As shown in FIG. 8, the bottom 40 of the lever 14 can have a recess 42 for receiving and anchoring an end of the spring 38. FIG. 9 shows an example leaf spring 38 that fits in the recess 42 at the bottom of the lever 14. Other springs such as coil spring, etc., can also be used.

As such, in the closed position shown in FIG. 3, the spring 38 pushes up against the bottom 40 of the lever 14 to pivot the lever 14 to an upright position such that the lever 14 blocks access to the hook aperture 13, forming the eye loop 15 with the hook 12.

As shown in FIGS. 1–2 and 4, to provide access via the aperture 13 in the hook 12, the thumb tab 16 is pushed down by a e.g. user's thumb to slide the thumb tab 16 down the slot 30 as it pivots the lever 14 clockwise into the recessed section 34 of the hook 12 against the spring resistance. As the lever 14 pivots into the open position in an essentially slanted angle, it unblocks the hook aperture 13.

Once the thumb tab 16 is released, the spring 38 forces the lever 14 back from the slanted position (FIG. 4) into the upright position (FIG. 3), counter clockwise, to block the aperture 13 of the hook 12.

Figure 10:
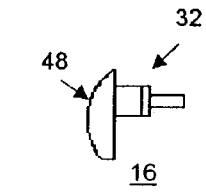
FIG. 10 shows a side view of the thumb tab of the snap hook of FIG. 1.

As shown in FIGS. 3–4, the hook 12 can include a stopper depression 44 for nesting an upper portion 46 of the lever 14, when the lever 14 is in the upright, closed position (FIG. 3). The lever 14 is pushed against the hook 12 in the depression 44, by the decompressing action of the spring 38, thereby keeping the lever 14 in the closed position which blocks the hook aperture 13. Referring to FIG. 10, the thumb tab 16 includes the rider pin 32 and a tab 48, wherein the rider pin 32 slides/rides the slot 30 in the hook 12, as the thumb tab 16 is operated to "hook" and "release" objects 20 into and out of the snap-hook 10, respectively.

There are two primary ways of hooking objects such as a rope 20 into the hook 12, when the lever 14 is in the closed position. In a first way of hooking objects, as shown in FIGS. 1–2, the thumb tab 16 is pushed down by a user to slide the pin 32 down the slot 30, whereby the pin 32 pushes against the bottom wall 28b of the opening 28 of the lever 14, to pivot the lever 14 into the open position.

In the example herein, the opening 28 in the lever 14 is larger in size than the pin 32 of the thumb tab 16. As such, as shown in FIGS. 3–4, according to a second way of hooking an object when the lever 14 is in the closed position (FIG. 3), directly pushing on the lever 14 with the rope 20 causes the lever 14 to pivot about the pin 26, such that as the lever 14 pivots the thumb tab pin 32 is not pushed down or moved by a side wall 28a of the opening 28 in the lever 14 to place the lever 14 in the open position (FIG. 4). As such, the thumb tab 16 does not need to be depressed (e.g., pushed/moved down) to open or attach the snap-hook 10 to the rope 20. This provides an "easy on" feature that allows holding the snap-hook 10 in one hand, and then pressing an object, such a rope 20 held in the other hand, against the lever 14 to slant/pivot the lever 14 and compressing the spring 38, thereby unblocking the hook aperture 13, and allowing the rope 20 into the hook 12 (FIG. 1).

After hooking the rope 20 into the hook 12, when the thumb tab 16 is released or when direct pressure against the lever 14 is removed, as the spring 38 decompresses the lever 14 then automatically moves back into the upright position (FIG. 3), counter clockwise, blocking the aperture 13. To take the rope 20 out of the hook 12 via the aperture 13, the thumb tab 16 is depressed/pushed down the slot 30 to move the lever 14 into a slanted position to unblock the hook aperture 13, allowing the rope 20 to be taken out of the hook 12 via the aperture 13 therein.

The position of the thumb tab 16 on the side of the snap-hook 10 (facing the user as the snap-hook lays flat in the palm of a user's hand) allows quick access to the thumb tab 16. Further, the location of the thumb tab 16 makes it much easier to depress/push down the tab 16 to move the lever 14 into the open (slanted) position (FIG. 4).

This allows for not only a quick and easy release/opening of the snap-hook 10 with one hand only, but also essentially eliminates any swiveling effect associated with conventional snap hooks. This is because, according to the present invention, the pressure to depress the thumb tab 16 is evenly distributed against the width of the snap-hook as it is properly supported in the palm of the hand, facing the user.

As shown in FIG. 5, the snap-hook may have essentially broad, opposing, front and back sides, and relatively narrower edges, such that the back side of the snap-hook can be placed into the palm of a user's hand to hold the snap hook 10, as shown in FIG. 1. The thumb tab 16 is located on the front side of the snap-hook 10 to allow simpler holding of the snap-hook 10 and operation of the release mechanism with one hand while essentially eliminating swiveling of the snap-hook 10 in the hand.

As shown in the drawings, the snap hook 10 can further include a second attachment loop 50 for attaching the snap hook 10 to another object, such as another end of rope 20 as shown in FIG. 1. The second loop 50 can be rotatably/pivotally connected to an end of the hook 12 using a pin 52.

The present invention has been described in considerable detail with reference to certain preferred versions thereof; however, other versions are possible. Therefore, the spirit and scope of the appended claims should not be limited to the description of the preferred versions contained herein.

What is claimed is:

1. A snap-hook, comprising:
a hook, forming a portion of an eye loop;
a lever that is pivotally movable relative to the hook, the lever forming a remaining portion of said eye loop with respect to the hook;
a thumb tab that essentially engages the lever, and is positioned in a slot defined in the hook, whereby the thumb tab is slidable in the slot relative to the hook, forming a release mechanism, such that the sliding movement of the thumb tab in the slot causes the lever to pivot relative to the hook to open said eye loop, the lever further including an opening for receiving a protruding portion of the thumb tab, such that the lever can rotate to open said eye loop, essentially without sliding the thumb tab down in the slot of the hook;
wherein the snap-hook has essentially broad, opposing, front and back sides, and relatively narrower edges, such that the back side of the snap-hook can be placed into the palm of a user's hand to hold the snap-hook, wherein the thumb tab is located on the front side of the snap-hook to allow simpler holding of the snap-hook and operation of the release mechanism with one hand while essentially eliminating swiveling of the snap-hook in the hand.

2. The snap-hook of claim 1, further comprising a biasing member positioned between the lever and the hook, whereby the lever is biased against pivotable movement with respect to the hook, and is pivotable relative to the hook to open the eye loop when a force is applied against the lever and/or the thumb tab to overcome the biasing force of the biasing member.

3. The snap-hook of claim 2, wherein the lever has a proximal and a distal end, such that the proximal end of the lever is pivotally connected to the hook, and the distal end of the lever is biased against a depression formed in the hook by the biasing member to form the eye loop.

4. The snap-hook of claim 1, wherein the hook has a recessed portion to accommodate movement of a portion of the lever therein as the lever pivots.

5. The snap-hook of claim 1, wherein the hook includes a body partially forming said portion of the eye loop.

6. The snap-hook of claim 1, wherein:
the lever opening is larger than said protruding portion of the thumb tab,
such that the lever can rotate, without a periphery of the lever opening pushing against said protruding portion or sliding the thumb tab down in the slot of the hook section.

7. The snap-hook of claim 6, wherein the lever opening is essentially triangular.

8. A snap-hook, comprising:
a hook section having an open segment, thereby forming a portion of an eye loop;
a lever that is pivotally movable relative to the open segment of the hook section to block and unblock the open segment, the lever forming a remaining portion of said eye loop with respect to the hook section;
a biasing means positioned between the hook and the lever for biasing the lever against pivoting relative to the hook;
a tab that engages the lever, the tab including an extension disposed in a slot defined in the hook section, such that the tab extension is slidable in the slot relative to the hook section;
the tab and the lever forming a release mechanism, such that applying force to the tab that overcomes said biasing, effects the tab extension to slide in the slot, thereby causing the lever to pivot relative to the hook section to open said eye loop;
wherein the lever further includes an opening for receiving a protruding portion of the tab, such that the lever can rotate to open said eye loop, essentially without sliding the tab down in the slot of the hook section;
wherein the snap-hook has essentially broad, opposing, front and back sides, and relatively narrower edges, such that the back side of the snap-hook can be placed into the palm of a user's hand to hold the snap-hook, wherein the thumb tab is located on the front side of the snap-hook to allow simpler holding of the snap-hook and operation of the release mechanism with one hand while essentially eliminating swiveling of the snap-hook in the hand.

9. The snap-hook of claim 8, wherein the biasing means comprises a spring positioned between the lever and the hook section, whereby the lever is biased against pivotable movement with respect to the hook section, and is pivotable relative to the hook section to open the eye loop when a force is applied against the lever and/or the tab to overcome the biasing force of the spring.

10. The snap-hook of claim 9, wherein the lever has a proximal end and a distal end, such that the proximal end of the lever is pivotally connected to the hook, and the distal end of the lever is biased against a depression formed in the hook by the biasing member to form the eye loop.

11. The snap-hook of claim 8, wherein the hook section has a recessed portion to accommodate movement of a portion of the lever therein as the lever pivots.

12. The snap-hook of claim 8, wherein the hook section includes a body partially forming said portion of the eye loop.

13. The snap-hook of claim 8, wherein:
the lever opening is larger than said protruding portion of the tab,
such that the lever can rotate, without a periphery of the lever opening pushing against said protruding portion or sliding the tab down in the slot of the hook section.

14. The snap-hook of claim 13, wherein the lever opening is essentially triangular.

15. A snap-hook, comprising:
a hook, forming a portion of an eye loop;
a lever that is movable relative to the hook, the lever forming a remaining portion of said eye loop with respect to the hook;
the lever further including an opening for receiving a protruding portion of a thumb tab, such that moving the thumb tab causes the lever to move relative to the hook to open said eye loop, wherein the lever can be moved to open said eye loop independent from moving the thumb tabs, without the thumb tab moving;
wherein the snap-hook has essentially broad, opposing, front and back sides, and relatively narrower edges, such that the back side of the snap-hook can be placed into the palm of a user's hand to hold the snap-hook, wherein the thumb tab is located on the snap-hook such that moving the thumb tab longitudinally relative to the snap-hook causes the lever to move relative to the hook to open said eye loop, to allow simpler holding of the snap-hook and operation of the release mechanism with one hand while essentially eliminating swiveling of the snap-hook in the hand.

16. The snap-hook of claim 15, further comprising a biasing member positioned between the lever and the hook, whereby the lever is biased against pivotable movement with respect to the hook, and is movable relative to the hook to open the eye loop when a force is applied against the lever and/or the thumb tab to overcome the biasing force of the biasing member.

17. The snap-hook of claim 16, wherein the lever has a proximal and a distal end, such that the proximal end of the lever is movably connected to the hook, and the distal end of the lever is biased against a depression formed in the hook by the biasing member to form the eye loop.

18. The snap-hook of claim 15, wherein the hook has a recessed portion to accommodate movement of a portion of the lever therein as the lever moves.

19. The snap-hook of claim 15, wherein:
 the lever opening is larger than said protruding portion of the thumb tab,
 such that the lever can rotate, without a periphery of the lever opening pushing against said protruding portion or moving the thumb tab.

20. The snap-hook of claim 19, wherein the lever opening is essentially triangular.

21. A snap-hook, comprising:
 a hook section having an open segment, thereby forming a portion of an eye loop;
 a lever that is pivotally movable relative to the open segment of the hook section to block and unblock the open segment, the lever forming a remaining portion of said eye loop with respect to the hook section;
 a biasing means positioned between the hook and the lever for biasing the lever against pivoting relative to the hook;
 a tab that engages the lever, the tab including an extension disposed in a slot defined in the hook section, such that the tab extension is slidable in the slot relative to the hook section;
 the tab and the lever forming a release mechanism, such that applying force to the tab that overcomes said biasing, effects the tab extension to slide in the slot, thereby causing the lever to pivot relative to the hook section to open said eye loop;
 wherein the lever further includes an opening for receiving and engaging a portion of the tab, such that the lever can rotate relative to the tab extension as the tab extension slides in the slot of the hook;
 wherein the snap-hook has essentially broad, opposing, front and back sides, and relatively narrower edges, such that the back side of the snap-hook can be placed into the palm of a user's hand to hold the snap-hook, wherein the thumb tab is located on the front side of the snap-hook to allow simpler holding of the snap-hook and operation of the release mechanism with one hand while essentially eliminating swiveling of the snap-hook in the hand.

\* \* \* \* \*